United States Patent
Maus et al.

(10) Patent No.: US 10,495,775 B2
(45) Date of Patent: Dec. 3, 2019

(54) METHOD TO PREDICT LOCAL GEOMAGNETIC DISTURBANCE FIELD AND ITS PRACTICAL APPLICATION

(71) Applicants: Schlumberger Technology Corporation, Sugar Land, TX (US); Magnetic Variation Services, LLC, Boulder, CO (US)

(72) Inventors: Stefan Maus, Boulder, CO (US); Benny Poedjono, Sugar Land, TX (US)

(73) Assignees: SCHLUMBERGER TECHNOLOGY CORPORATION, Sugar Land, TX (US); MAGNETIC VARIATION SERVICES, LLC, Boulder, CO (US)

(*) Notice: Subject to any disclaimer, the term of this patent is extended or adjusted under 35 U.S.C. 154(b) by 400 days.

(21) Appl. No.: 14/906,750

(22) PCT Filed: Jul. 24, 2014

(86) PCT No.: PCT/US2014/047989
§ 371 (c)(1),
(2) Date: Jan. 21, 2016

(87) PCT Pub. No.: WO2015/013499
PCT Pub. Date: Jan. 29, 2015

(65) Prior Publication Data
US 2016/0161626 A1    Jun. 9, 2016

Related U.S. Application Data

(60) Provisional application No. 61/858,014, filed on Jul. 24, 2013.

(51) Int. Cl.
*G01V 3/26* (2006.01)
*G01V 13/00* (2006.01)
(Continued)

(52) U.S. Cl.
CPC .............. *G01V 3/26* (2013.01); *E21B 47/022* (2013.01); *G01V 3/087* (2013.01); *G01V 3/18* (2013.01);
(Continued)

(58) Field of Classification Search
CPC . G01V 3/26; G01V 13/00; G01V 3/40; G01V 3/087; G01V 3/38; G01V 3/18; E21B 47/022
See application file for complete search history.

(56) References Cited

U.S. PATENT DOCUMENTS

| 4,761,889 A | 8/1988 | Cobern et al. | |
| 5,960,370 A * | 9/1999 | Towle | G01V 3/26 702/7 |

(Continued)

FOREIGN PATENT DOCUMENTS

| EP | 0242424 A2 | 10/1987 |
| RU | 236965 C1 | 3/1969 |

(Continued)

OTHER PUBLICATIONS

International Search Report and the Written Opinion for International Application No. PCT/US2014/047989 dated Nov. 24, 2014.
(Continued)

*Primary Examiner* — Christopher P McAndrew
*Assistant Examiner* — Zannatul Ferdous (57) ABSTRACT

A method for correcting geomagnetic reference field includes measuring Earth magnetic field elements at least one known geodetic position. Earth magnetic field elements are measured at a position proximate the location. A disturbance function is determined from the Earth magnetic field measurements made at the at least one known geodetic position. A magnetic disturbance field measurement transfer function is estimated between the at the at least one known (Continued)

geodetic and proximate positions to estimate a disturbance function at the proximate position. The estimated magnetic disturbance function is used to correct geomagnetic reference field or measurements made at the location.

25 Claims, 5 Drawing Sheets (51) Int. Cl.
    *G01V 3/40* (2006.01)
    *G01V 3/08* (2006.01)
    *G01V 3/18* (2006.01)
    *G01V 3/38* (2006.01)
    *E21B 47/022* (2012.01)

(52) U.S. Cl.
    CPC ............... *G01V 3/38* (2013.01); *G01V 3/40* (2013.01); *G01V 13/00* (2013.01)

(56) References Cited

U.S. PATENT DOCUMENTS

| | | | |
|---|---|---|---|
| 6,021,577 A | 2/2000 | Shiells et al. | |
| 2006/0260843 A1 | 11/2006 | Cobern | |
| 2007/0203651 A1* | 8/2007 | Blanz | E21B 47/022 702/6 |
| 2010/0096186 A1* | 4/2010 | Ekseth | E21B 7/067 175/45 |
| 2014/0081574 A1* | 3/2014 | Hove | E21B 47/022 702/6 |

FOREIGN PATENT DOCUMENTS

| | | |
|---|---|---|
| RU | 2226283 C1 | 3/2004 |
| SU | 266051 | 3/1970 |
| SU | 1087622 A1 | 4/1984 |
| SU | 1264122 A1 | 10/1986 |
| SU | 1377377 A1 | 2/1988 |
| WO | 2015013499 A1 | 1/2015 |

OTHER PUBLICATIONS

International Preliminary Report on Patentability issued in International Patent application PCT/US2014/047989, dated Jan. 26, 2016, 6 pages.

Egbert, et al. "Robust estimation of geomagnetic transfer functions," Geophys. J. R. astir. Soc., 87, pp. 173-194, 1986.

Office Action and Search Report issued in Russian patent application 2016105641/03 dated Sep. 26, 2019, 15 pages.

Decision on Grant issued in Russian patent application 2016105641103 dated Nov. 27, 2017, 23 pages.

* cited by examiner

METHOD TO PREDICT LOCAL GEOMAGNETIC DISTURBANCE FIELD AND ITS PRACTICAL APPLICATION

This application is based upon prior filed U.S. provisional patent application Ser. No. 61/858,014 filed on Jul. 24, 2013, the entire contents of which are incorporated herein by reference.

BACKGROUND

This disclosure relates generally to the field of geomagnetic surveying. More particularly, the disclosure relates to method for predicting a local geomagnetic disturbance field so that geomagnetic surveys may be more accurately referenced to the true geomagnetic field.

Accurate knowledge of the local geomagnetic field is required for numerous applications, such as navigation, attitude determination and control of moving objects, pointing of antennas, directional drilling, magnetic surveying, location of buried objects, magnetic signature reduction, and magnetic anomaly detection, among others. For example, well placement by measurement while drilling (MWD) often uses the direction of Earth's geomagnetic field as a reference direction. To compute the geodetic azimuth of a bottom hole assembly (BHA), which is an assembly of various types of drilling tools, the MWD tool makes measurements of the Earth's magnetic field and the user relates the measurements to the geomagnetic reference field at the well drilling site. This requires accurate knowledge of the local geomagnetic reference field direction (with respect to a geodetic reference) and strength.

For applications in well placement, i.e., directional drilling, a method known in the art as Interpolated In-Field Referencing (IIFR) is described in U.S. Pat. No. 6,021,577 issued to Shiells et al. The IIFR method provides an estimate of a magnetic disturbance field at the drill site. The IIFR method is a method in which disturbance field variations at a drill site are inferred from Earth magnetic field variations measured at remote sites. The IIFR method includes the following contributions to the geomagnetic field:

(i) a constant difference between the geomagnetic field elements between the drill site and each of the remote sites (equation: $E_R(t_1) = E_R^{var}(t_1) + E_R^{b1}$);

(ii) a phase shift of the a daily (24 hour period) variation, due to the difference in geographic longitude between the drill site and each of the remote sites (the first term on the right side in equation for $E_R^{var}(t_1)$); and (iii) a weighted average of the short-term "high-pass filtered" variations at the remote sites (the second term on the right side in equation for $E_R^{var}(t_1)$).

Correction (i) simply expresses the fact that there is a difference between the geomagnetic field at the drill site and each of the remote sites. The foregoing correction does not include the effects of the disturbance field.

A possible limitation of corrections (ii) and (iii) is that they assume that the geomagnetic variations at the drill site are identical to a weighted average of the variations at the remote sites (except for a phase shift of the 24 hour daily variation to account for longitude differences between the drill site and each of the remote sites). This assumption is not usually correct in practice.

The actual magnetic disturbance field is the sum of source fields, caused by electric currents in the ionosphere and magnetosphere, and secondary induced fields, caused by electromagnetic induction in the Earth and oceans. By computing the magnetic variations at the drill site from a weighted average of the variations at the remote sites, the IIFR method makes two assumptions that are frequently incorrect:

(a) that the source fields are identical at the drill site and the remote sites. This may be incorrect because the source fields vary spatially, in particular at high latitudes; and (b) that induced fields are identical at the drill site and the remote sites. This may be incorrect because of differences in the subsurface electrical conductivity between the drill site and the remote sites. Electrical conductivity depends on the local composition and water content of the subsurface. Particularly in situations where the drill site is offshore and the remote sites are on-shore, differences in conductivity may be many orders of magnitude, leading to large differences in geomagnetic variations and a failure of the IIFR method to perform correctly.

DETAILED DESCRIPTION

For practical purposes, the naturally occurring geomagnetic field at any location can be divided into three contributions:

(i) the geomagnetic main field, usually given by global Earth magnetic field models. The geomagnetic main field primarily originates in the Earth's core and changes slowly on time scales of months to years.

(ii) the local crustal anomaly or crustal bias, caused by magnetic minerals in the Earth's crust in the vicinity of the area in which Earth magnetic field based surveys are to be performed; and (iii) the magnetic disturbance field caused by electric currents in near-Earth space, and by corresponding mirror-currents induced in the Earth and oceans. The disturbance field typically varies on time scales of seconds to days. Most of the variation at high latitudes occurs at periods of minutes to hours.

All of the three foregoing contributions should be taken into account when computing an accurate local geomagnetic reference field.

Figure 1:
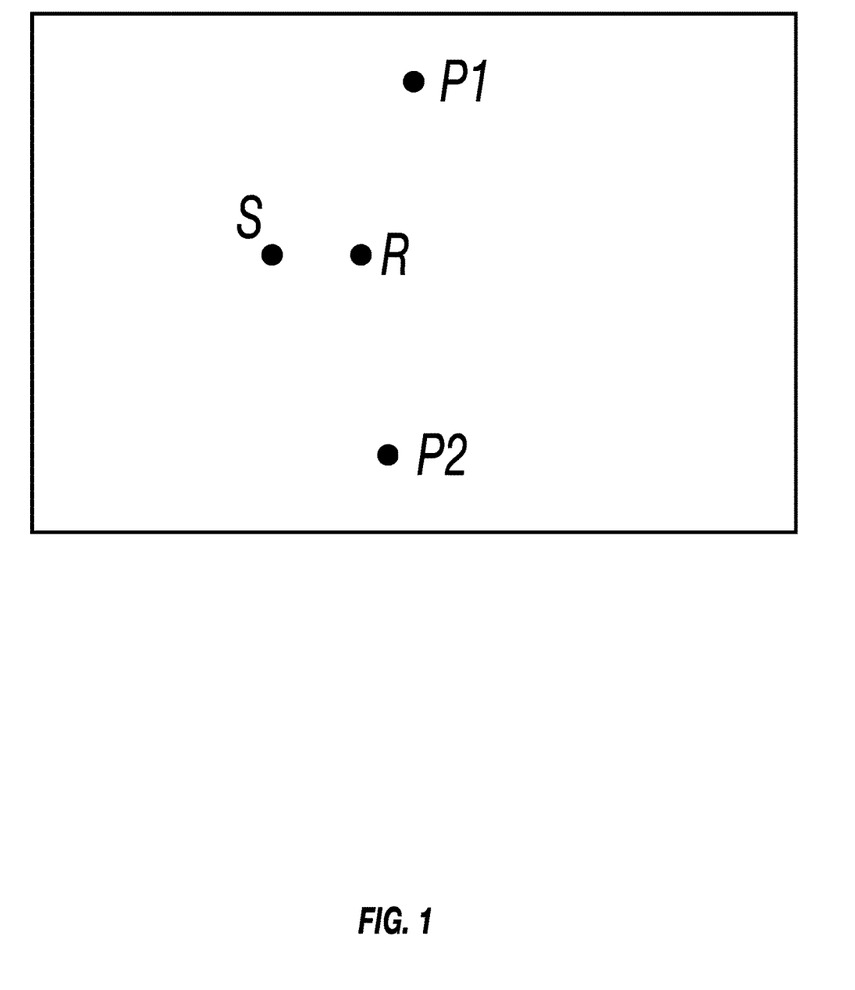
FIG. 1 is a diagram illustrating the relative locations of the local site and associated remote measurement sites.

In a first phase of a method according to the present disclosure, remote magnetic field monitoring stations may be selected and a local variometer may be deployed for a limited period of time or long term. Referring to FIG. 1, a site, S is shown where magnetic surveys are to be used to make Earth magnetic field measurements, for example to determine geodetic trajectory of a directionally drilled wellbore. Remote monitoring stations are shown at P1 and P2, and a local variometer is shown at R deployed proximate the site S. Proximate in the present context may be defined as at a distance far enough from the site S so that magnetic disturbances created by the presence of magnetic materials and electrical equipment substantially do not affect measurements made at the local variometer site R. While two remote stations P1 and P2 are used in the present example, the disclosure contemplates the use of only one, or more than two such remote stations. Accordingly the scope of the disclosure is not limited to the two-station example provided herein.

The remote stations P1, P2 may provide accurate geomagnetic field measurements with stable baselines and may have the ability to transfer their measured data in real-time to the site S or any other location. The remote stations P1, P2 may be geomagnetic observatories or variometer stations which are already in operation and whose geodetic positions are known or determinable. In case suitable remote stations are not available in adequate proximity of the site S, additional remote stations may be deployed. The remote stations P1, P2 may be in operation during the time period in which the local variometer R is deployed.

At the position shown at R in FIG. 1, a 3-component magnetic variometer may be deployed to continuously record local geomagnetic field variations with a suitable sampling rate (e.g., about 0.1 to 10 Hz). The variometer may be a three-axis linear-core fluxgate magnetometer, widely used at variometer stations in North America and Northern Europe. In some examples, the three axes may be mutually orthogonal. An example of a variometer that may be used in some examples is sold under model designation Suspended dIdD by GEM Systems, 135 Spy Court, Markham, Ontario, Canada, L3R 5H6. This type of magnetic variometer consists of an absolute field Overhauser sensor surrounded by sets of inclination and declination coils. The Overhauser sensor measures the absolute strength of the magnetic field. The coils then generate a short sequence of magnetic probing fields. The three orthogonal vector components (X, Y, Z) of the geomagnetic field may then be computed from the response of the absolute sensor and the probing fields. A possible advantage of this type of sensor is that it provides substantial baseline stability and very low temperature sensitivity, making it particularly suitable for both temporary and long-term deployment as a variometer.

The remote stations P1, P2 and the local variometer at R may measure any number of the seven geomagnetic elements (northerly intensity X, easterly intensity Y, vertical intensity Z, total intensity F, dip or inclination angle I, declination angle D, and horizontal intensity H that is sufficient to resolve all seven components of the geomagnetic field.

Only three of the geomagnetic elements are independent. For example, if X, Y and Z are measured or known, then H, F, D and I can be inferred by $H=\sqrt{X^2+Y^2}$, $F=\sqrt{H^2+Z^2}$, $I=\arctan(Z,H)$, $D=\arctan(Y,X)$, where $\arctan(a,b)$ is $\tan^{-1}(a/b)$, taking into account the angular quadrant. Correspondingly, X, Y and Z can be computed from D, I and F.

Figure 2:
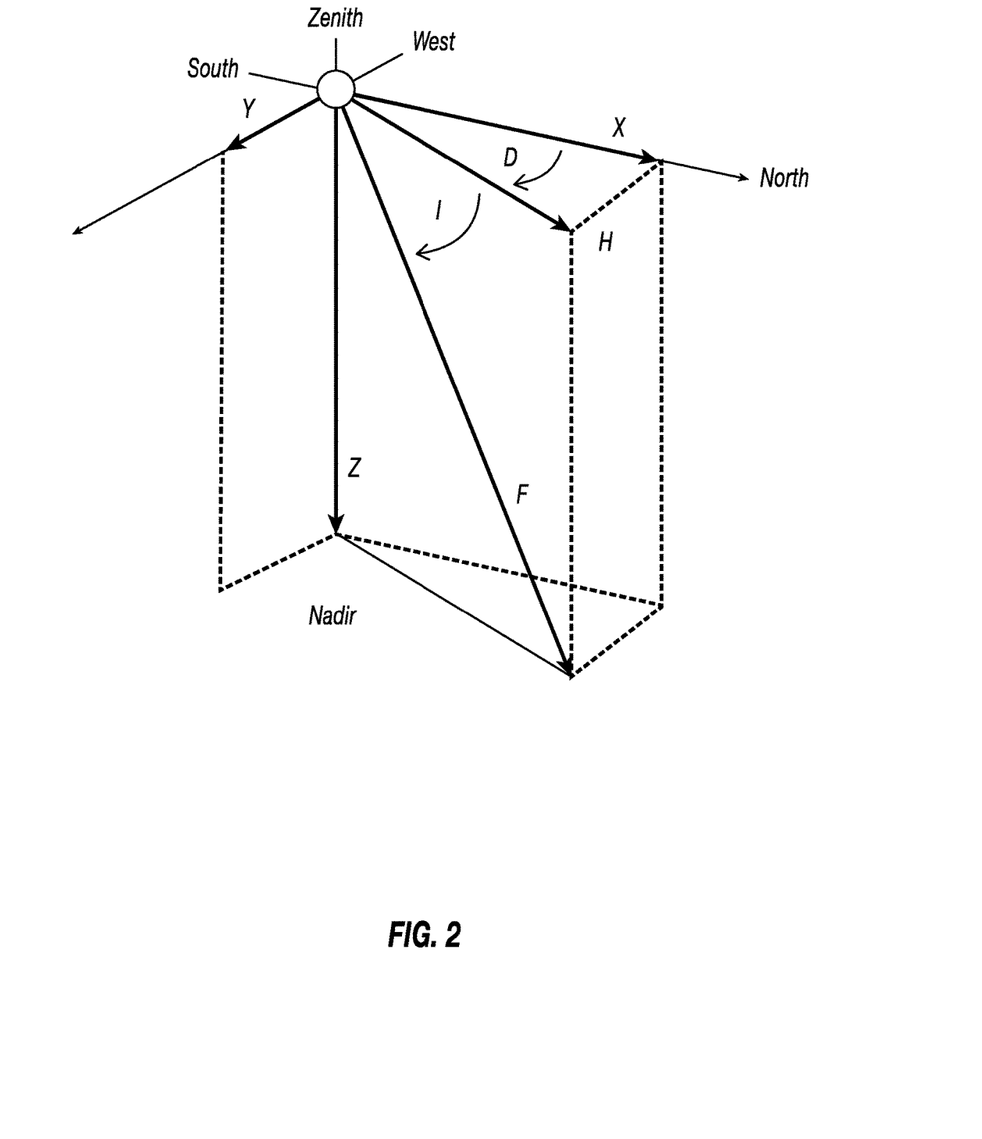
FIG. 2 shows the geomagnetic elements describing the vector of the Earth's magnetic field.

FIG. 2 depicts the above described geomagnetic elements. Different combinations of the geomagnetic elements may be used to describe a geomagnetic field vector. The seven elements of the geomagnetic field vector B in the geodetic reference frame are northerly intensity X, easterly intensity Y, vertical intensity Z (positive downwards), total intensity F, inclination angle I, (also called the dip angle and measured from the horizontal plane to the field vector, positive downwards), declination angle D (also called the magnetic variation and measured clockwise from true north to the horizontal component of the field vector), and horizontal intensity H.

Figure 3:
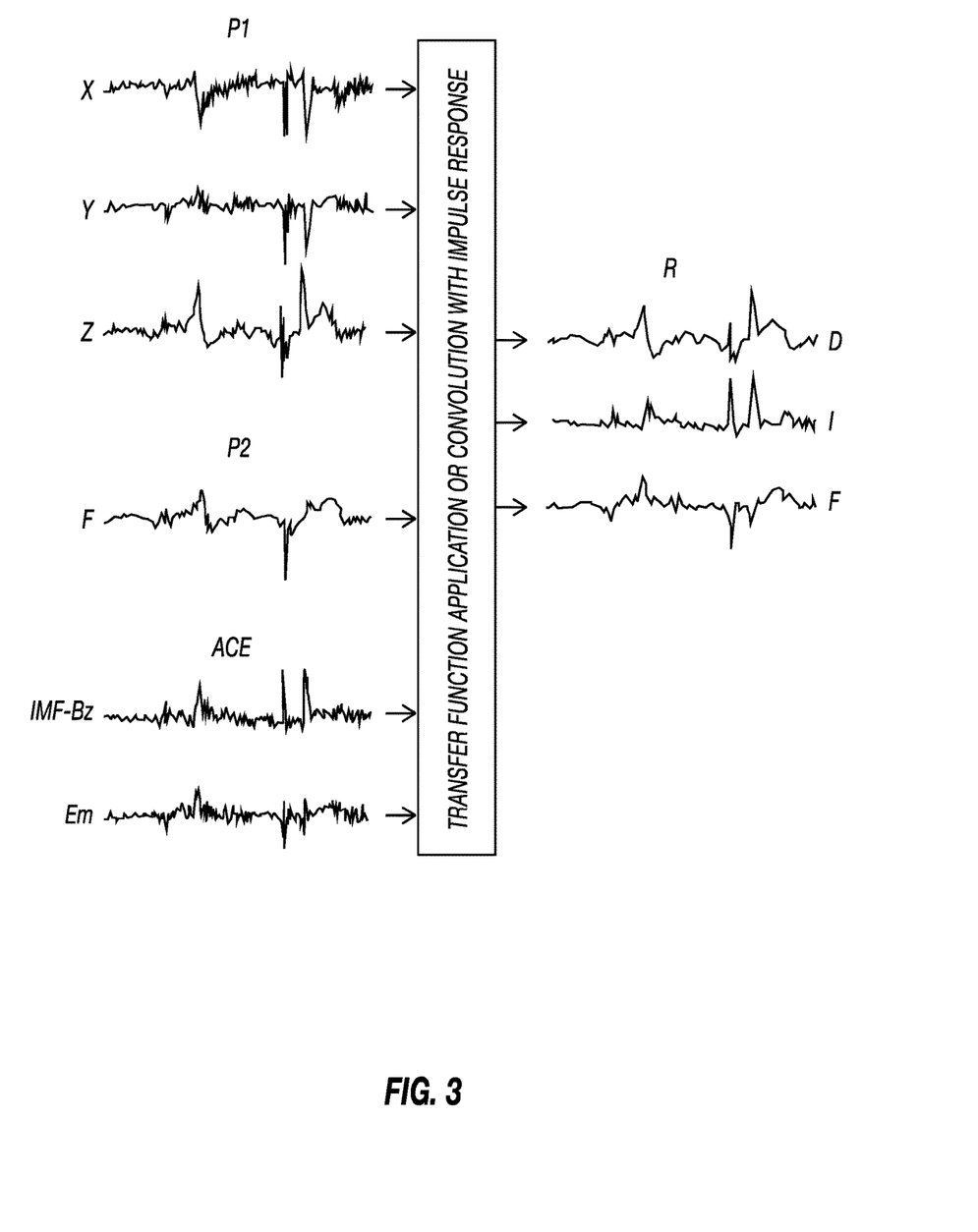
FIG. 3 is a diagram showing how the measured input parameters (magnetic elements X, Y, Z and F at remote sites, and solar wind parameters IMF-Bz and Em) measured by the ACE spacecraft relate to the predicted disturbance field elements (Declination, Dip and Total Field) at the local site for a sample configuration.

FIG. 3 illustrates an example configuration in which measurements of the geomagnetic elements X, Y, Z and F at the remote sites P1 and P2 are combined with measurements from the Interplanetary Magnetic Field z-component (IMF-Bz); and the merging electric field (Em) as measured by the Advanced Composition Explorer (ACE) spacecraft to provide input channels. Applying the transfer function in the frequency domain or an equivalent convolution in the time domain provides predicted disturbance field variations present in the geomagnetic elements D, I and F at the location R in proximity of the local site (e.g., site S in FIG. 1).

Referring once again to FIG. 1, a location substantially free of man-made magnetic field disturbance sources such as roads, railways, bridges, pipelines, and platforms etc., may be selected as the monitoring site R. A 3-component magnetic variometer as explained above may then be deployed at the site R, such that temperature variations and mechanical movements of the variometer are minimized. Possibilities for variometer deployment include burying the variometer proximate the land surface or deploying it on the bottom of a body of water for marine uses. The 3-component geomagnetic field variations may be measured and recorded at the site R for a selected period of time. The variometer deployment period can extend from several days to continuous long term deployment.

In a second phase of a method according to the disclosure, a transfer function may be estimated between measurements made at the remote stations P1, P2 and the measurements made by the magnetic variometer deployed at the selected position R. The remote stations should be in operation during the time in which the local variometer is operating at R.

The number of remote stations (e.g., at P1, P2) may be denoted by n. If each of the remote stations measures three components of the geomagnetic field vector, then the result provides 3n channels $U_j$ with $j=1, \ldots, 3n$.

The disturbance field may then be isolated from the slowly varying main geomagnetic field and the crustal field. One example method to perform such isolation is to fit and subtract a simple linear regression line from each of the 3n channels $U_j$. In case the period of investigation (recording time at each remote site P1, P2) is longer than about 3 months, the linear approximation may no longer be adequate to represent the main geomagnetic field and the crustal field and it may be desirable to subtract higher-order functions such as splines. The spline functions $S_j(t)$ may be fit to the measurements from each of the 3n input channels $U_j(t_i)$, where $t_i$ are the time stamps of the measurements, by minimizing a cost or error function, such as may be in the form $E=\Sigma_i(S_j(t_i)-U_j(t_i))^2$. Suitable spline functions may be, for example, cubic B-splines. A knot separation may then be selected which is longer than the longest period of the disturbance field to be represented in the transfer function. For example, if disturbance field variations with a period of up to 1 month are to be predicted, then the knot separation of the splines may be wider than 1 month. The spline functions represent the slowly varying parts of the geomagnetic field, mostly composed of the main geomagnetic field and the crustal field.

A remote station, e.g., P1, P2 in FIG. 1, may be geodetically fixed or may be a variometer installed on a moving vehicle, for example a vessel on the surface of a body of water, a wave glider or a land based vehicle. For movements within a limited area (within a maximum radius of about 5 km), the disturbance field may be considered to be spatially uniform. However, spatial gradients of the main geomagnetic field and the crustal field will appear as magnetic field variations along the path of the vehicle. In order to correct for this effect, the spatial variation of the main geomagnetic and the crustal field at a movable remote site may be represented by a function $C_j(x,y)$ of the spatial coordinates x and y for the magnetic component with index j measured at the remote station, e.g., P1, P2 in FIG. 1. The local spatial variation functions $C_j(x,y)$ may already be known. Otherwise, the local spatial variations may be estimated from the measurements $U_j$ by extending the above described linear regression to a multivariate linear regression in t, x and y. Another technique to account for spatial variation may be to extend the temporal spline function model $S_j(t)$ with a spatial model $C_j(x,y)$ represented by a low-order polynomial in x and y. Minimizing the function $E=\Sigma_i(S_j(t_i)-U_j(t_i))^2$ then provides the temporal-spatial model $S_j(t)C_j(x,y)$ of the main geomagnetic field and the crustal field for the magnetic component with index j.

The slowly varying main geomagnetic field and the crustal field components may then be removed from the measurements made at the remote stations (e.g., P1, P2 in FIG. 1) by subtracting the linear regression lines, splines or temporal-spatial models from the 3-component measurements. The residuals from the subtraction provide the magnetic disturbance field in each of the components at each of the remote sites (e.g., P1, P2). The foregoing are then the 3n "input channels."

In some examples, it may be desirable to visually inspect data recordings made by the local magnetic variometer and correct the recorded data for any spikes due to instrument noise or man-made disturbances.

Then, the regression lines or splines with the same knot separation as described above may be fit to each of the 3-component measurements from the local variometer. Then one may subtract the regression lines or splines from the 3-component data measured at the local variometer site R. The residuals (differences) provide the magnetic disturbance field at the local site. These differences are the 3 "output channels."

A geomagnetic transfer function between the 3n input channels and 3 output channels may then be estimated, for example, using a method such as the one described in, Egbert, G. D. and J. R. Booker, *Robust estimation of geomagnetic transfer functions*, Geophys. J. R. Astr. Soc., 87, 173-194 (1986) or a further example method described below.

A multiple-input multiple-output (MIMO) transfer function may be estimated between the 3n input channels (for example X, Y, and Z for each remote station) and 3 output channels as follows. Denote the 3n input channels as $U_j$ with j=1, . . . , 3n, and the output channels as $V_k$ with k=1, 2, 3.

The transform from $U_j$ to the corresponding output channel $V_k$ may be performed in the frequency domain for a moving window. Let the index i denote the i-th window position. Applying a Fast Fourier Transform (FFT) to the 3n input channels of the i-th window provides their complex Fourier coefficients $\tilde{U}_{j,i}(\omega_l)$, one for each frequency $\omega_l$. The Fourier transform of the output channel $\tilde{V}_{k,i}(\omega_l)$ can then be predicted from the three input channels using the relationship:

$$\tilde{V}_{k,i}(\omega_l) = (T_{1,k}(\omega_l), \ldots, T_{3n,k}(\omega_l)) \begin{pmatrix} \tilde{U}_{1,i}(\omega_l) \\ \cdots \\ \tilde{U}_{3n,i}(\omega_l) \end{pmatrix}$$

Note that all coefficients in the foregoing relationship are complex, so they have an imaginary part and a real part. In matrix notation, the matrix of output FFT coefficients $\tilde{V}$ is related to the matrix of input FFT coefficients $\tilde{U}$ via the transfer function matrix T:

$$\tilde{V} = T\tilde{U}$$

A least squares solution for T may then be given by the expression:

$$T = (\tilde{U}^T\tilde{U})^{-1}\tilde{U}^T\tilde{V}$$

Thus, the transfer function matrix T may be computed from the windowed Fourier transforms of the input and output channels by a standard least squares inversion. However, the resulting transfer function matrix T may be noisy and therefore may need to be smoothed by applying a filter in the frequency domain.

The result of the above procedure is a smooth transfer function matrix T, relating the input channels at the remote monitoring sites P1, P2 to the output channels at the local variometer site R.

The foregoing may be repeated for all permutations of subsets of the remote stations. In case of non-availability of one or more of the remote sites (e.g., P1, P2), the magnetic disturbances at the local site R can then still be predicted with the foregoing method.

Using the transfer function matrix T, the local geomagnetic reference field may then be predicted at the site S with or without a local monitoring station (e.g., at R). The present method will work for present measurement and the past, even for periods prior to the deployment of the local magnetic variometer, as long as one or more of the remote stations was already in operation during the prior periods. To use the foregoing technique, the following may be implemented.

(a) quality control check the measurements at the remote sites and correct for spikes due to instrument noise, man-made disturbances and base-line shifts;

(b) fit and subtract a linear regression line, splines or temporal-spatial models, representing the main geomagnetic field and the crustal field, from all components at all remote sites. The regression lines or splines can be extrapolated forward in time in order to avoid having to re-compute them at every time step. The residuals of the measurements at the remote sites after subtracting the regression lines, splines or temporal-spatial models constitute the input channels.

The transfer function matrix T computed as explained above is applied to the input channels, either using a windowed Fourier transform or a wavelet transform in the frequency domain, or by performing an equivalent convolution in the time domain, in order to compute the output channels. The output channels constitute the predicted disturbance field at the local site R.

For the location, depth and use date, one may add a global main geomagnetic field model and a crustal correction (if available) to the disturbance field prediction. This gives the final geomagnetic reference field at any given instance and location at the local site S.

Figure 4:
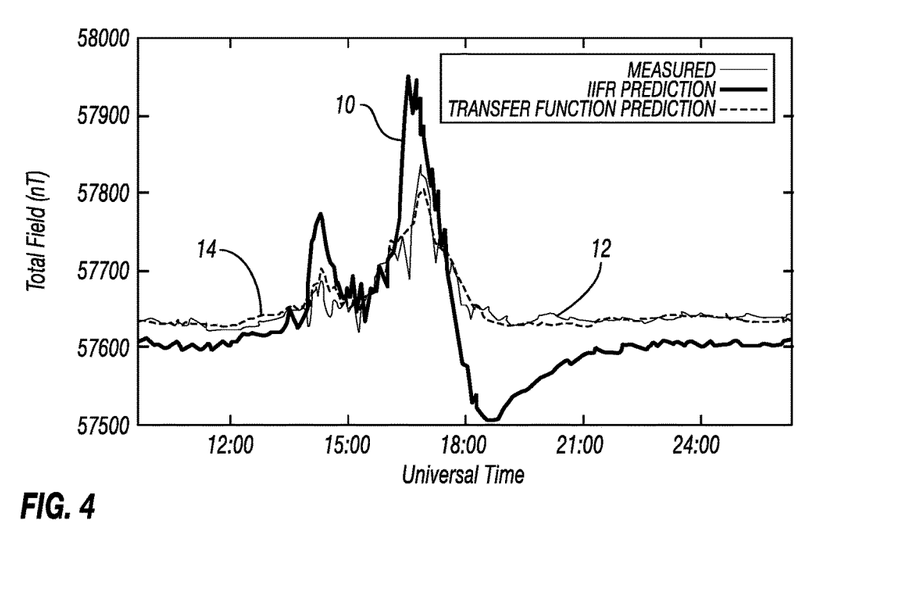
FIG. 4 shows a comparison of measured magnetic field and predicted fields using the IIFR method and the transfer function method.
Figure 5:
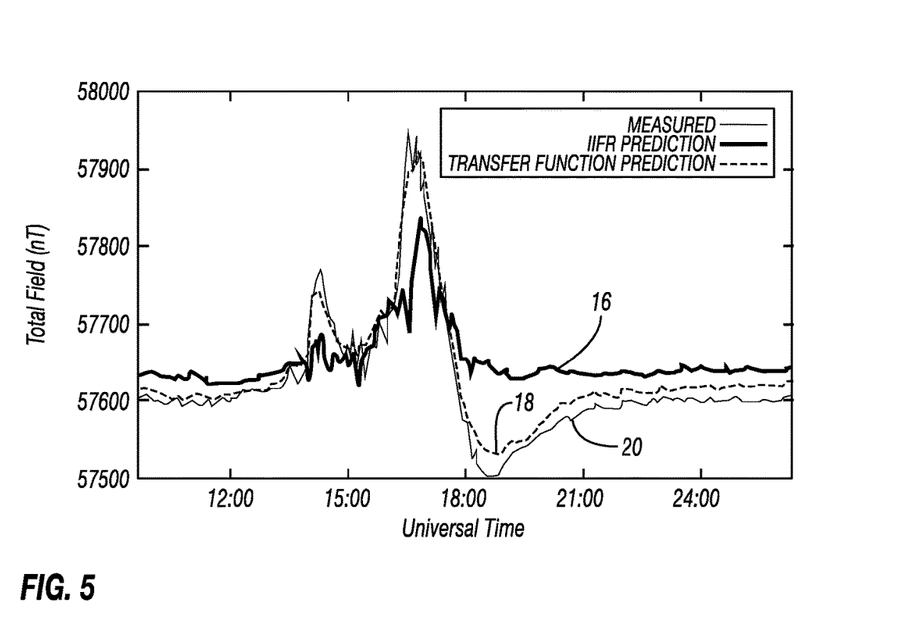
FIG. 5 shows a comparison of measured magnetic field at a second measurement station and predicted magnetic field from the station of FIG. 4 using the IIFR and transfer function methods.

FIG. 4 shows an example of prediction of the disturbance field at the Barrow observatory maintained by the United States Geologic Survey from measurements at the nearby Deadhorse observatory. The measured disturbance field is shown at curve 12, the predicted curve from the measurements at Deadhorse using the transfer function calculated as explained above is shown at 14, and the prediction using the IIFR method known prior to the present disclosure is show at curve 10. The reverse prediction (measurements at Deadhorse and predictions at Barrow) are shown in FIG. 5. The measured value is shown by curve 20, the transfer function predicted curve is shown at 18 and the IIFR predicted curve is shown at 16.

After having estimated the transfer function matrix, the transfer function matrix may be applied to the 3n input channels during the deployment period of the local variometer (e.g., at R in FIG. 1), and the predicted output may be compared with the measured output channels from the variometer. Agreement between the predicted and measured output channels provides a robust verification of whether the selected remote stations are suitable for predicting the disturbance field at the local site. Otherwise, additional remote stations may be used in order to improve the disturbance field prediction at the local site.

The variometer may continue to remain deployed at the local site (R in FIG. 1) during, e.g., well placement operations. The prediction of the transfer function may then regularly be verified against the magnetic elements measured by the variometer. One may also directly use the variometer measurements as the geomagnetic reference field at the local site. However, the continuous availability of accurate measurements from a locally deployed variometer may not be guaranteed. To avoid outages and increase the reliability of the present example method, it is therefore preferable to predict the disturbance field at the local site from multiple remote stations and use the measurements at the local site only to validate and/or improve the remote predictions. The above described examples of remote geodetically fixed positioned sites and spacecraft are only examples and are not intended to limit the scope of the present disclosure In directional wellbore drilling, the predicted total geomagnetic field and dip may be compared with MWD geomagnetic directional surveys taken in a subsurface wellbore. The validation method requires that the MWD tool is well calibrated and drill string magnetic interference is kept at a minimum by using a non-magnetic BHA. The difference between the predicted and MWD-surveyed total geomagnetic field and dip is then indicative of the quality of the prediction of the geomagnetic azimuth. The prediction can be considered "within specifications" if the differences for the total field and dip fall within predetermined threshold values. Similar validations can be performed in other applications, provided that the measurements of the application are of sufficient quality and the presence of magnetic interference can be ruled out.

During and after the application of the above described method, the geomagnetic field components predicted by the described method enable quality control of the local geomagnetic measurements. This is possible because a combination of magnetometer and accelerometer measurements in a typical MWD instrument allows the computation not only of the geomagnetic azimuth, but also of the strength and dip of the geomagnetic field. The measurements of the dip and strength can be compared with the predicted strength and dip in order to quality control the geomagnetic field measurements made according to the present method and check for the presence of external magnetic interference which may impede the proper function of the method.

For example, the validation of wellbore MWD surveys may be performed as follows: For every MWD survey, compare the measured total field and dip with the final reference values computed as explained above. If the difference between the measured and predicted values is at most a selected threshold value, the MWD survey may be accepted as valid. In another implementation, instead of qualifying individual MWD surveys, a Multi-Station Analysis (MSA), see paper no. 49060, Society of Petroleum Engineers, Richardson, Tex., may be carried out on a set of MWD surveys originating from the same well or the same BHA-run to compensate for MWD tool biases, scale factors and drill string interference. The MSA quality acceptance criteria may then be applied to the MWD surveys after applying the MSA.

Figure 6:
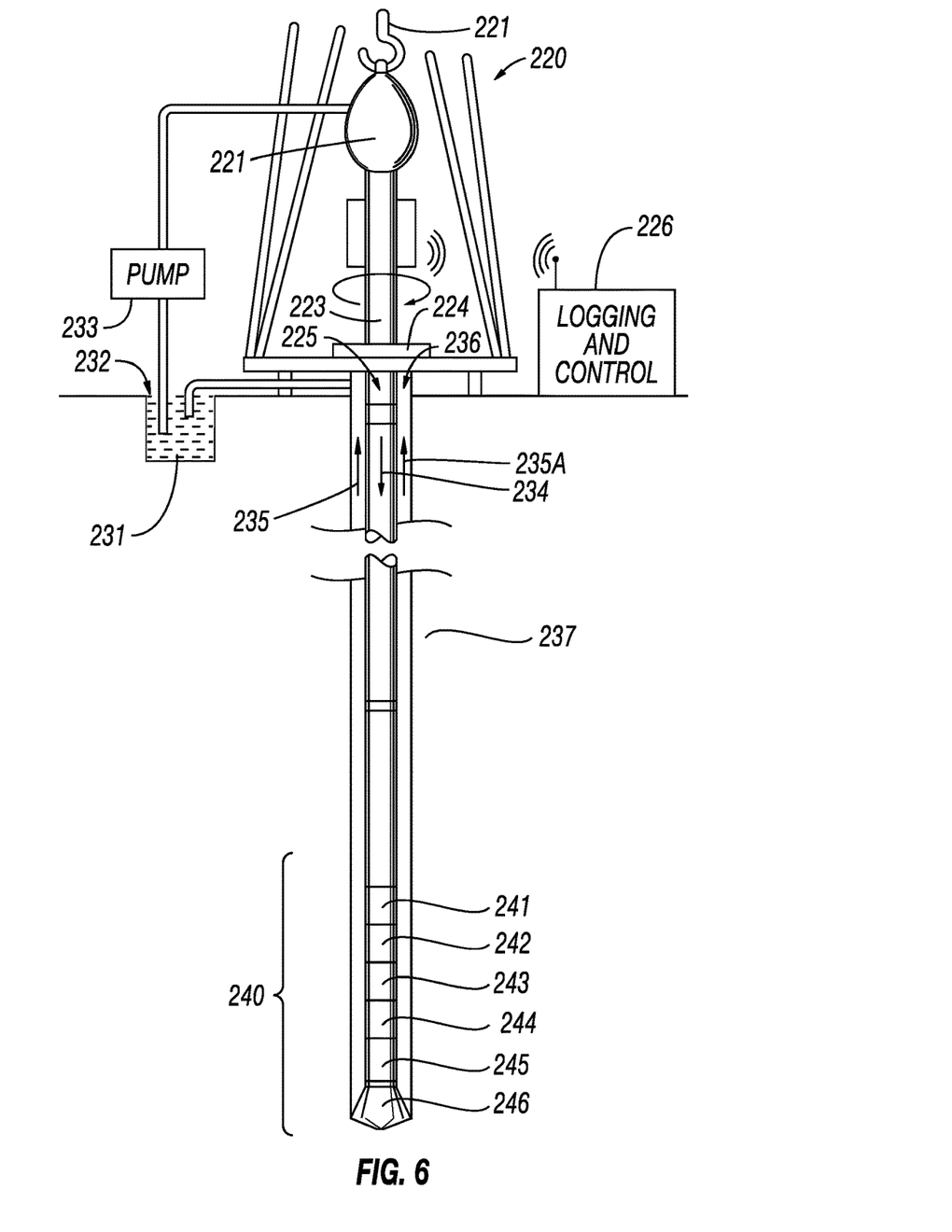
FIG. 6 illustrates a wellsite system in which aspects of the present disclosure may be used.

FIG. 6 illustrates a wellsite system in which aspects of the present disclosure may be used. The wellsite can be onshore or offshore. In this example system, a borehole is formed in subsurface formations by rotary drilling in a manner that is well known.

A drill string 225 is suspended within a borehole 236 and has a bottom hole assembly (BHA) 240 which includes a drill bit 246 at its lower end. A surface system 220 includes platform and derrick assembly positioned over the borehole 236, the assembly including a rotary table 224, kelly (not shown), hook 221, and rotary swivel 222. The drill string 225 is rotated by the rotary table 224 energized by means not shown, which engages the kelly (not shown) at the upper end of the drill string 225. The drill string 225 is suspended from the hook 221, attached to a traveling block (also not shown), through the kelly (not shown) and the rotary swivel 222 which permits rotation of the drill string 225 relative to the hook 221. As is well known, a top drive system could be used instead of the system shown in FIG. 6.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid to flow downwardly through the drill string 225 as indicated by the directional arrow 234. The drilling fluid exits the drill string via ports (not shown) in the drill bit 246, and then circulates upwardly through an annulus region 235 between the outside of the drill string 225 and the wall of the borehole 236, as indicated by the directional arrows 235 and 235A. In this well-known manner, the drilling fluid lubricates the drill bit 246 and carries formation cuttings up to the surface as it is returned to the pit 231 for recirculation.

The BHA 240 of the illustrated embodiment may include a measuring-while-drilling (MWD) tool 241, a logging-while-drilling (LWD) tool 244, a rotary steerable directional drilling system 245 and motor, and the drill bit 250. It will also be understood that more than one LWD tool and/or MWD tool can be employed, e.g. as represented at 243.

The LWD tool 244 is housed in a special type of drill collar, as is known in the art, and can contain one or a plurality of known types of logging tools. The LWD tool may include capabilities for measuring, processing, and storing information, as well as for communicating with the surface equipment.

The MWD tool 241 is also housed in a special type of drill collar, as is known in the art, and can contain one or more devices for measuring characteristics of the drill string and drill bit. The MWD tool 241 may further include an apparatus 242 for generating electrical power to the wellbore deployed system. This may typically include a mud turbine generator powered by the flow of the drilling fluid, it being understood that other power and/or battery systems may be employed. In the present embodiment, the MWD tool 241 may include one or more of the following types of measuring devices: a weight-on-bit measuring device, a torque measuring device, a vibration measuring device, a shock measuring device, a stick slip measuring device, a direction measuring device (e.g., a three component geomagnetic direction sensor), and an inclination measuring device such as a three component accelerometer. The power generating apparatus 242 may also include a drilling fluid flow modulator for communicating measurement and/or tool condition signals to the surface for detection and interpretation by a logging and control unit 226. In cases where the borehole is inclined from vertical, rotation of the drill string (or BHA if a drill string disposed motor is used) may be used to obtain measurements that are responsive preferentially to the borehole and preferentially to the formation by reason of the rotation and the fact that the drill string will tend to rest on the gravitational low side of the borehole. At selected times, drilling operations may be temporarily stopped, and the direction sensor and inclination sensor may be used to determine the azimuth and inclination of the wellbore as it is directionally drilled. The azimuth, which may be determined by Earth magnetic field measurements, may be corrected using the example techniques explained above to obtain geodetic azimuth more accurately than using the IIFR method known prior to the present disclosure. Measurements of azimuth and inclination may be used to enable drilling the wellbore along a selected trajectory by appropriate operation of a steerable drilling motor or rotary steerable directional drilling system 245.

It is also possible to adjust previously performed magnetic directional surveys made by instruments such as MWD instruments by determining the disturbance field at the site S using the transfer function determined from the remote site measurements at the time the previously performed directional survey was made. Any other magnetic element measurements may be similarly corrected for times prior to deployment of the variometer at the site R proximate the site S using the same technique.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for computing a local geomagnetic disturbance field, comprising:
   measuring Earth magnetic field elements at at least one known geodetic position;
   measuring Earth magnetic field elements at a position proximate a location where the local geomagnetic disturbance field is to be computed;
   determining a disturbance function from the Earth magnetic field measurements made at the at least one known geodetic position; and
   calculating a magnetic disturbance field measurement transfer function between the at least one known geodetic position and the proximate position to estimate the local geomagnetic disturbance field at the proximate position.

2. The method of claim 1 further comprising using the estimated geomagnetic disturbance field is-used to correct a geomagnetic reference field at the location.

3. The method of claim 1 wherein the estimated geomagnetic disturbance field is used to correct geomagnetic measurements made at the location.

4. The method of claim 1 wherein the measuring the Earth magnetic field elements at the proximate position comprises using a variometer.

5. The method of claim 4 wherein the variometer comprises a flux gate magnetometer.

6. The method of claim 5 wherein the flux gate magnetometer comprises three mutually orthogonal magnetic field sensors.

7. The method of claim 1 wherein the calculating the magnetic disturbance field transfer function comprises calculating windowed Fourier transforms of the measurements at the at least one known geodetic position and measurements at the proximate position by a least squares inversion.

8. The method of claim 7 further comprising applying a smoothing filter to an output of the least squares inversion.

9. The method of claim 1 wherein the magnetic disturbance field is calculated by subtracting a main magnetic field component and a crustal field component from the measurements made at the at least one known geodetic position and the proximate positions.

10. The method of claim 9 wherein the main magnetic field component and crustal field component are determined by linear regression of the measurements made at the at least one known geodetic and the proximate positions.

11. The method of claim 9 wherein the main magnetic field component and crustal field component are determined by spline fit of the measurements made at the at least one known geodetic position and the proximate position.

12. The method of claim 2 further comprising using the corrected geomagnetic reference field to calculate a geodetic referenced direction from Earth magnetic field measurements.

13. The method of claim 1 wherein the transfer function is used to calculate a corrected geomagnetic reference field at a time prior to making measurements at the location.

14. The method of claim 1 wherein the measuring Earth magnetic field elements comprises at least one of measuring at a geodetically fixed position, a moving platform and measuring from a spacecraft.

15. A method for directionally drilling a wellbore, comprising:
   inserting a measurement while drilling system associated with a directional drilling system into a wellbore, the measurement while drilling system including at least one Earth magnetic field sensor,
   operating the directional drilling system;
   at selected times, making measurements of Earth magnetic field elements using the at least one Earth magnetic field sensor;
   correcting the measurements made by the at least one Earth magnetic field sensor for a magnetic disturbance field, wherein the correcting comprises, measuring Earth magnetic field elements at at least one known geodetic position, measuring Earth magnetic field elements at a position proximate the wellbore, determining a disturbance function from the Earth magnetic field element measurements made proximate the at least one known geodetic position, calculating a magnetic disturbance field measurement transfer function between the at least one known geodetic and the proximate position to estimate a magnetic disturbance function at the proximate position and using the estimated magnetic disturbance function to correct geomagnetic measurements made at the wellbore; and using the corrected measurements made by the at least one magnetic field sensor in the measurement while drilling system to determine a geomagnetic direction of the wellbore.

16. The method of claim 15 wherein the measuring the at least one Earth magnetic field element comprises using a variometer.

17. The method of claim 16 wherein the variometer comprises a flux gate magnetometer.

18. The method of claim 17 wherein the flux gate magnetometer comprises three mutually orthogonal magnetic field sensors.

19. The method of claim 15 wherein the calculating the magnetic disturbance field transfer function comprises calculating windowed Fourier transforms of the measurements at the at the at least one known geodetic position and the proximate position by a least squares inversion.

20. The method of claim 19 further comprising applying a smoothing filter to an output of the least squares inversion.

21. The method of claim 15 wherein the magnetic disturbance field is calculated by subtracting a main magnetic field component and a crustal field component from the measurements made at the at least one known geodetic position and the proximate position.

22. The method of claim 21 wherein the main magnetic field component and the crustal field component are determined by linear regression of the measurements made at the at least one known geodetic position and the proximate position.

23. The method of claim 21 wherein the main magnetic field component and crustal field component are determined by spline fit of the measurements made at the at least one known geodetic position and the proximate positions.

24. The method of claim 15 further comprising using the corrected geomagnetic measurements to calculate geodetic referenced direction measurements.

25. The method of claim 15 wherein the transfer function is used to calculate corrected geomagnetic measurements of a previously surveyed wellbore.

* * * * *